United States Patent [19]

Caughman et al.

[11] Patent Number: 4,674,057

[45] Date of Patent: Jun. 16, 1987

[54] ULTRASONIC RANGING CONTROL SYSTEM FOR INDUSTRIAL ROBOTS

[75] Inventors: Donald O. Caughman, Marietta; Wallace J. Plumley, Acworth, both of Ga.

[73] Assignee: Lockheed Corporation, Calabasas, Calif.

[21] Appl. No.: 842,057

[22] Filed: Mar. 18, 1986

Related U.S. Application Data

[63] Continuation of Ser. No. 580,064, Feb. 14, 1984, abandoned.

[51] Int. Cl.$^4$ .............................................. B25J 19/00
[52] U.S. Cl. ..................................... 364/513; 364/167; 901/46; 73/625; 73/628; 73/641; 414/5
[58] Field of Search ................... 364/513, 167; 901/46, 901/47; 73/625, 628, 641; 414/730, 5

[56] References Cited

U.S. PATENT DOCUMENTS

| | | | |
|---|---|---|---|
| 3,934,457 | 1/1976 | Clark et al. ............................. | 73/641 |
| 3,967,242 | 6/1976 | Isoo et al. ............................. | 364/513 |
| 4,028,533 | 6/1977 | Matsubara ............................. | 364/513 |
| 4,119,900 | 10/1978 | Kremmitz ............................. | 364/513 |
| 4,166,543 | 9/1979 | Dahlstrom ............................. | 364/513 |
| 4,196,049 | 4/1980 | Burns et al. ............................. | 901/46 |
| 4,326,155 | 4/1982 | Griebeler ............................. | 901/46 |
| 4,370,889 | 2/1983 | Ruthrof et al. ............................. | 901/46 |
| 4,490,660 | 12/1984 | Tsuchihasi ............................. | 364/513 |
| 4,575,304 | 3/1986 | Nakagawa et al. ............................. | 901/47 |

OTHER PUBLICATIONS

"Computer Controlled Robot with Ultrasonic Sensor," Affinito et al., IBM Technical Disclosure Bulletin, vol. 18, No. 8, Jan. 1976.
"Ultrasonic Ranging System", Polaroid Corporation.

Primary Examiner—Jerry Smith
Assistant Examiner—John R. Lastova
Attorney, Agent, or Firm—Vangelis Economou; Eric R. Katz; Stanley L. Tate

[57] ABSTRACT

The invention combines a plurality of ultrasonic ranging transducers (11) arrayed proximate the end (12) of a movable robot arm (13), all transducers (11) being mounted to a common base so as to be pivotally movable both horizontally and vertically relative to the robot arm (13) by stepping motors (17 and 20). By controlling the pivotal movements of the transducer array (10) by a microcomputer (22) so as to look in the direction of intended travel of the robot arm end (13), and as to the robot arm end (13) moves, unexpected objects in the path of the robot (14) or aberrant motion by the robot (14) become easily detected. Upon the sensing of an obstruction to the direction of motion of the robot arm (13), or aberrant motion thereof, a signal from the microcomputer (22) to the robot (14) controls will halt further operation until the obstruction is removed or the problem corrected.

6 Claims, 5 Drawing Figures

ULTRASONIC RANGING CONTROL SYSTEM FOR INDUSTRIAL ROBOTS

This is a continuation of co-pending application Ser. No. 580,064 filed on Feb. 14, 1984 now abandoned.

TECHNICAL FIELD

This invention generally relates to a safety system for an industrial robot which assures a safe environment for the robot during operation and more particularly to a robotic safety system whereby any aberrant motion of the robot as well as abnormal obstructions of personnel or equipment within the robot's path of travel are sensed so that the robot is put on hold upon such sensing to avoid injury to personnel or damage to equipment.

BACKGROUND ART

Prior art safety systems regarding industrial robots have involved alarm and restraint systems of a fixed or static nature over substantially the entire area of the robot's capability of operational movement regardless of the specific area or precise pattern of movements to be made during the operational assignment of the robot. Examples of fixed nature alarm systems are pressure sensitive floor and light beam arrays established around the perimeter of the total capable traval area of the robot, while examples of static restraint systems include a chain or guard rail structure surrounding such overall area of operational capability of the robot.

These prior art safety systems are an inefficient use of floor space or area when the robot is to be operated over only a portion of the area of its capability. Due to this lack of specific correlation between the movement of the robot and the area sensed by the safety system, a false alarm will result should an individual or piece of equipment enter into the controlled area or to a location that would not interfere in any manner with the operational mode of the robot. Thus, the prior art safety systems provide an inefficient means of protection when viewed in terms of operational productivity.

Additionlly, these prior art safety systems are poorly adapted for handling a situation where the robot exhibits aberrant motion, which oftentimes, occurs when the robot is unattended. Aberrant motion usually results when the robot is put on hold, for example, to permit the operator to leave the immediate area, and despite the hold condition, the robot exhibits unprogrammed motion. With the prior art safety systems, this aberrant motion will remain undetected unless the robot blocks a light beam or the like of the safety system.

DISCLOSURE OF THE INVENTION

It is, therefore, an object of the present invention to provide a safety system for a robot, the safety system being adapted to monitor the presence of unexpected people or objects in a work area, or detect aberrant motion behavior of a robot and subsequently modify the robot's behavior and/or warn any intruder or operator of the exception condition.

This invention teaches the use of a plurality of individual ultrasonic ranging transducers arranged in a horizontal array, and mounted at the end of the arm of an industrial robot, but independent of any end manipulator or hand installed on the robot arm. The mounting of the array on the robot arm is such that the array is arcuately pivotable in a horizontal sense so as to be located horizontally in the intended direction of movement of the robot arm, as well as being arcuately pivotable in a vertical sense. The pivotal movements of the array are effected by a pair of stepping motors which in turn are controlled by a microcomputer or controller which monitors the sensing array and provides the necessary interaction with the robot and its directions of movements whereby the detection of an unprogrammed object (personnel or equipment) in the intended path of travel of the robot will interrupt such travel thereof before any physical contact takes place.

The major components of the ultrasonic safety system comprise azimuth and elevation stepping motors, stepping motor controllers, a microcomputer, an ultrasonic ranging transducer or sensor array, position encoders and robot interface logic. Physically, the safety system or device is contained in three packages. The transducer array, motors and encoders sit on the end of the robot on top of, for example, the link between the fifth and sixth axes (yaw and roll, respectively). The ultrasonic electronics are likewise mounted on the robot arm just behind the transducer array. The stepping motor controllers and the microcomputer and robot interface logic reside in a cabinet sitting on a support behind the robot.

The motors, their controllers and encoders are used to move the ultrasonic sensor array in two directions. Azimuth movement is used to point the sensor in the direction of the robot's intended motion. The elevation motor steps the array through an up/down sweep in the vertical plane. The sensor array comprises, for example, five Polaroid sensors arranged in an arc in a single substantially horizontal plane. The robot interface logic is employed to interface the signals of the robot with the microcomputer. The microcomputer controls the signals necessary for obtaining motion for the two stepping motors, calculates ranging information based on the ultrasonic array, and activates the hold signal of the robot.

The ultrasonic sensor array scans in an up/down fashion the entire time the robot is active. The sensor array direction can be one of sixteen horizontal positions. Outputs from the robot are used to select one of these positions which faces the sensor array in the direction of the robot's intended movement. When any object or person moves within a predetermined threshold distance of the robot, a signal is sent which stops the robot, starts a warning signal and results in a message being started from the computer overseeing the application. Once the obstacle is removed and the stop or hold condition eliminated the robot continues in its programmed path. Since simple thresholding is used with no discriminatory capabilities, the hold circuit is disabled once the robot approaches a work jig and enabled once it is at the work jig where the sensor array is looking away from the robot to the side. In the case of aberrant motion, the system is programmed to detect motion during a hold condition. Thus, any unexpected motion of the robot during a hold condition is sensed by the system and the hold condition re-established.

BEST MODE OF CARRYING OUT THE INVENTION

Figure 1:
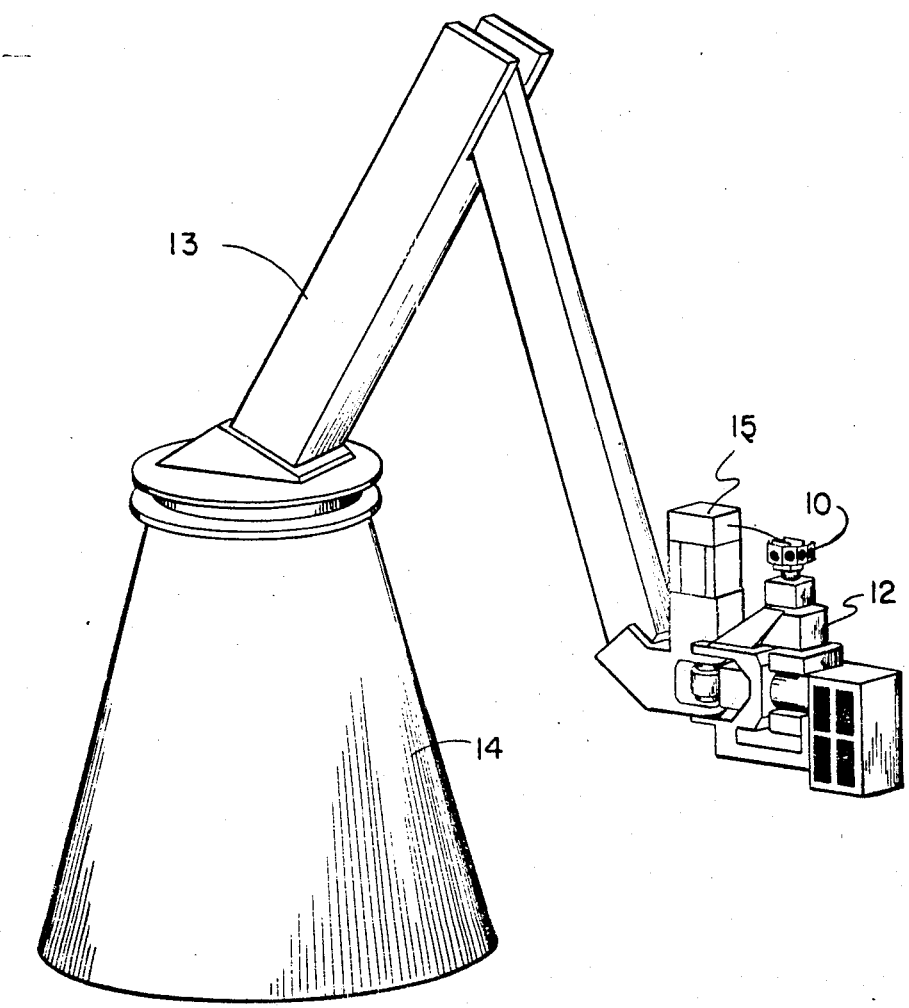
FIG. 1 is an overall perspective view of one exemplary industrial robot with the movable ultrasonic sensing array of one embodiment of this invention shown mounted proximate the robot arm end.
Figure 2:
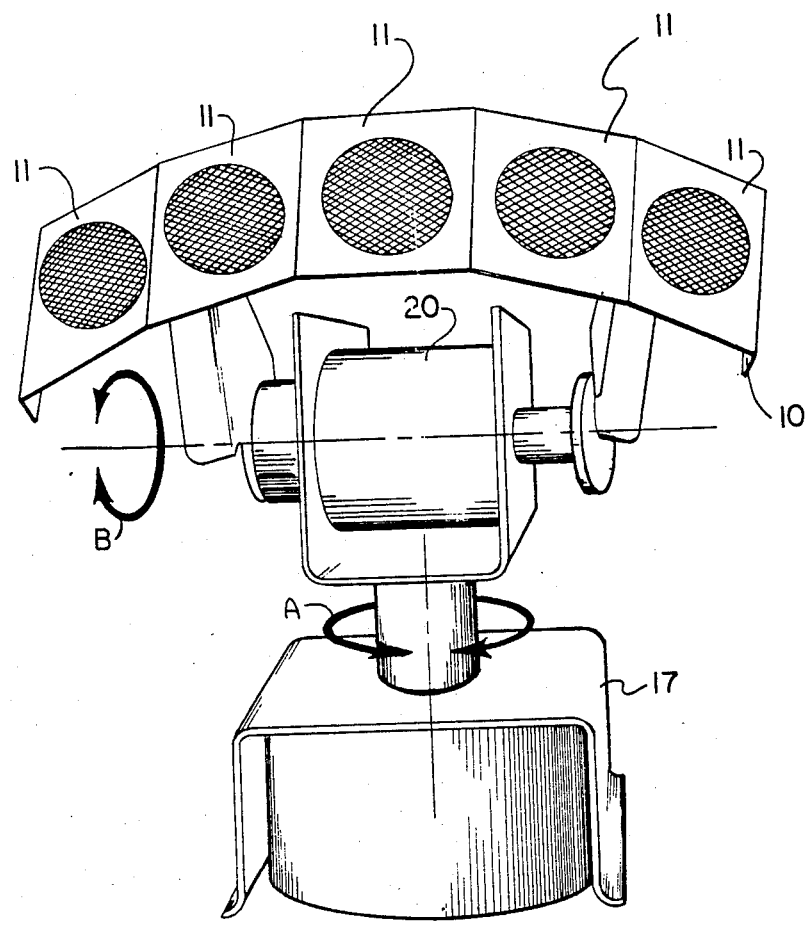
FIG. 2 is a perspective view showing the portion of the ultrasonic transducer array assembly to be mounted to the end of a robot arm.
Figure 4:
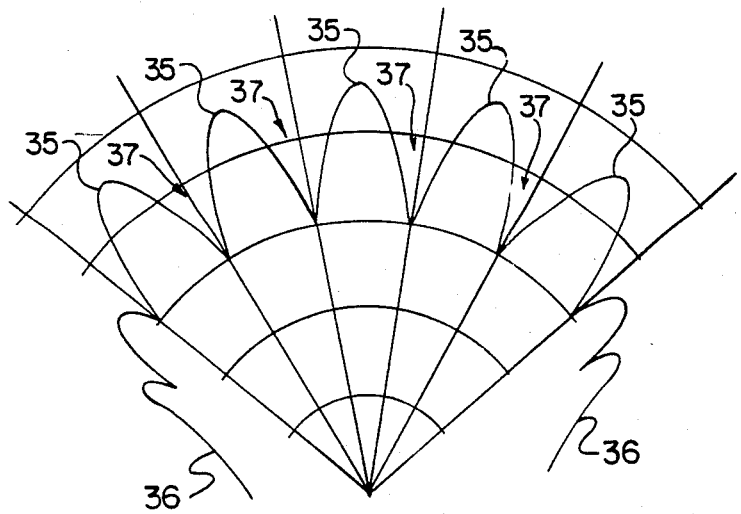
FIG. 4 is an exemplary pattern array of the plurality of sonar or ultrasonic transducers utilized in the depicted embodiment of the invention; and, FIG. 5 is a flow diagram representative of the preferred embodiment of the invention showing the signal processing by the microcomputer to effect operation of the safety system.

Referring to FIGS. 1 and 2, the invention comprises an array 10 of ultrasonic ranging transducers 11 mounted on the end 12 of the arm 13 of an industrial robot 14. In the preferred embodiment, the array 10 comprises a plurality of ultrasonic transducers 11 which each emit an individual beam of acoustical energy. The transducers 11 are mounted on the array in an angular manner so as to emulate a single transducer with a wide transmit/receive pattern in the horizontal plane as shown in FIG. 4. The individual transducers 11 are arranged, for example, arcuately about a horizontal plane approximately 20 degrees apart whereby with a quantity of five such transducers a horizontal beam width of approximately 100 degrees can be attained.

The transducers 11 utilized in the preferred embodiment of the invention are commercially available from the Polaroid Corporation of Cambridge, Mass. These items are marketed as a Polaroid Ultrasonic Ranging Unit, which comprises two primary components, an acoustical transducer, which is identified in the drawings by the numeral 11, and an ultrasonic transducer circuit board or circuit means. The ultrasonic transducer circuit boards are contained in a circuit board magazine 15 that is mounted near array 10 with each individual transducer 11 connected to its respective ultrasonic transducer circuit board in magazine 15 by appropriate wiring.

The base supporting the vertically pivotable array 10 is located, for example, atop a horizontal pivoting bidirectional stepping motor 17 that, in turn, is located on the top or upper surface of the end 12 of robot 14. The array 10 and drive motor 20 are adapted to be positioned or swung in the directions of arrows A about a vertical axis relative to the end 12 by bi-directional stepping motor 17.

The array 10 is also pivotally mounted in a horizontal sense to the shaft of a second bi-directional stepping motor 20 to drive the array 10 in an up and down vertical sweep about a horizontal axis in the directions of arrows B. Thus, the transducer array 10 provides wide coverage in the vertical plane by physically sweeping the array 10 with stepping motor 20. The motion is, however, not continuous, but rather the array 10 stops, transmits, listens and moves.

In the preferred embodiment, the extent of the rotational movement of array 10 and its drive motor 20, such movement being represented by arrows A, is approximately 270° or approximately 135° in each direction from the horizontal centerline defined by arm 13 of robot 14. Likewise, the extent of vertical rotation or up and down sweep of array 10 represented by arrows B is approximately 150° or approximately 75° in each direction from a position of array 10 parallel to the end of robot arm 12.

Figure 3:
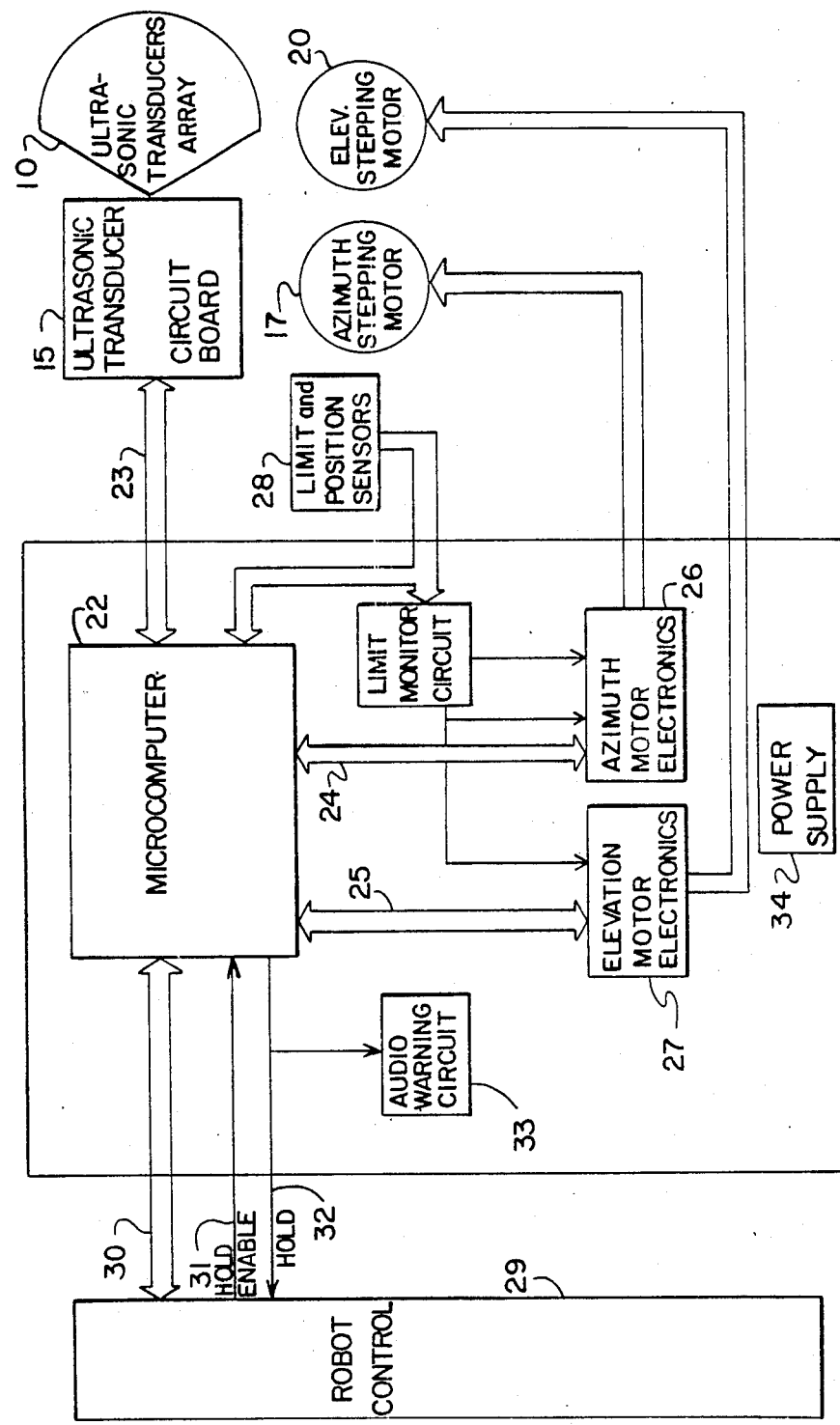
FIG. 3 is a block diagram of the preferred embodiment of the invention.

Referring to FIG. 3, it will be seen that certain components of the disclosed embodiment are depicted within a cabinet 21; it being understood, however, that the disclosed placement of a particular component or components in a designated or particular cabinet is a matter of design selection and is not critical.

Operational control of this invention is effected by a controller or microcomputer 22 comprising a microprocessor chip or circuit board, a program storage memory including read only memory (ROM), and random access memory (RAM); each of which may be appropriately selected from a number of such microcomputer elements which are currently available and familiar to those skilled in the art.

Microcomputer 22 is connected by bi-directional buses or lines 23, 24, and 25, respectively, to the transducer electronics of circuit board magazine 15, the azimuth motor electronics 26, and the elevation motor electronics 27. Data and information are also received by microcomputer or controller 22 from limit and position sensors 28 associated with both the azimuth and elevational stepping motors 17 and 20, and from the main control 29 of robot 14 over lines 30 and 31. Line 32 interconnects the microcomputer 22 with the robot control 29 to transmit a "hold" or "stop" signal to the robot 14 should an unprogrammed or abnormal obstruction in the path of travel of the end 12 of robot 14 be sensed by operation of the array 10. In the embodiment shown, line 32 is also connected to an audio warning circuit 33 to energize an appropriate audio warning device upon the occurrence of transmittal of a "hold" signal to robot 14; it being understood this feature of audio warning being merely operational and not constituting a critical feature or element of the invention.

Also contained within cabinet 21 is an appropriate power supply 34, which while not shown in FIG. 3, is to be understood as supplying electrical power to all of the various components of the system through well-known cabling and bussing techniques.

Referring to FIG. 4, there is depicted a typical transmitting beam or acoustical lobe composite of the five ultrasonic transducers 11 that form array 10. Each acoustical transducer 11, controlled by its individual ultrasonic circuit board contained in magazine 15, is capable of detecting the presence and distance of objects within a range of approximately 0.9 to 35 feet that is within the individual acoustical lobe pattern. Preferably, the sensitivity of the transducers 11 is set at approximately 10 feet. It should be noted that up to the maximum achievable limit of 35 feet, the operating range of the system is totally programmable. This is due to the fact that the threshold limits are determined by the software. Each transducer 11, (heretofore identified as a component in a Polaroid Ultrasonic Ranging Unit from Polaroid Corporation), serves as both an emitter to transmit an outgoing signal and an electrostatic sensor to receive a reflected signal or echo. The diameter of the transducer 11 determines the individual acoustical lobe pattern, or acceptance angle, during the transmitting and receiving operations, with each lobe pattern comprising a main or central peak 35 and reduced side lobe patterns 36 on each side of the main peak 35. With the array 10 consisting of five transducers in the preferred embodiment, the side lobe patterns 36 of each transducer 11 will overlap with each of their adjacent transducers 11 to produce an overall total pattern of five peaks 35 and four valleys 37 as seen in FIG. 4.

Should the presence of the pattern valleys 37 be objectionable or undesirable in any application or practice of this invention, such valleys 37 may be reduced, if not completely eliminated, by a modification of the signals to the azimuth and elevation stepping control motors (17 and 20, respectively) by microcomputer 22 as will be explained in more detail hereinafter.

When the transducers 11 of array 10 are activated, each transducer 11 emits a sound pulse, then waits to receive the echo returning from whatever object the sound pulse has struck. The emitted pulse is a high-frequency, inaudible "chirp" lasting for approximately one millisecond and comprising fifty-six pulses at four separate ultrasonic frequencies: e.g., 60 kHz, 57 kHz, 53 KHz and 50 kHz. Occasionally, a single frequency could be cancelled because of certain target topographical characteristics, and no echo would be reflected. Thus, by the use of four frequencies, such possibility is minimized if not overcome.

The elapsed time between transmissions and echo detections is converted to distance with respect to the speed of sound. For example, for a transmitted pulse to leave a transducer 11, strike an object ten feet (3.05 meters) away, and to return to the transducer 11, requires an average time lapse of 17.75 milliseconds or 1.78 milliseconds per foot (0.3 meters) of round trip distance. Thus, utilizing the elapsed time between transmission and detection, it is possible to determine the distance of a detected object.

Figure 5:
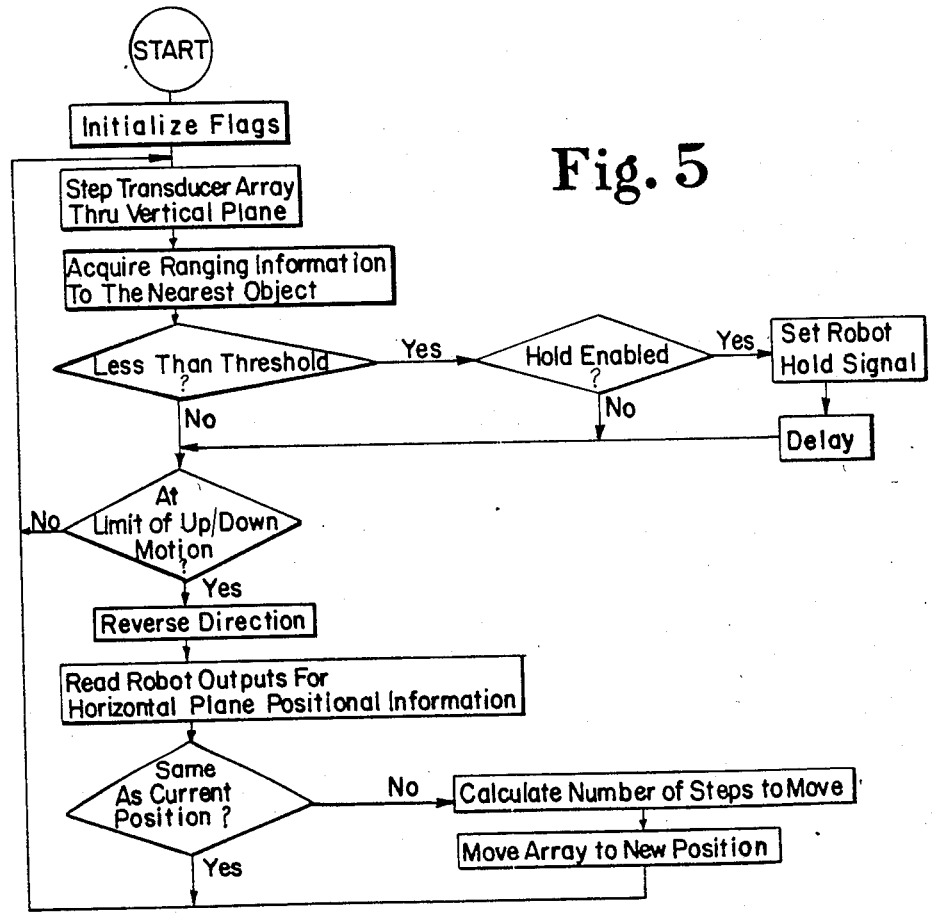

The utilization of the invention will be explained with reference to FIG. 5 which reflects the flow chart of the control and operation effected by microcomputer 22 (FIG. 3) when the arm 13 of robot 14 is in operation. Upon actuation of the robot 14, initialize flags indicate the boundary of the field of movement of the transducer array 10. Thereafter, the array 10 begins a vertical sweep which comprises a reciprocating up and down motion which is continued during the operation of the device.

As the array 10 is scanned in the vertical direction, information is acquired concerning the range or distance of the nearest object. If the distance sensed is less than a preset threshold then a hold enable evaluation is conducted. If the object detected is not expected then a hold signal is sent to robot control 29 and the operation of the robot 14 is stopped. However, should the object be an expected object then operation of the device continues uninterrupted. Once the upper or lower limit of vertical pivot of the array 10 is sensed, the operation of stepping motor 20 is reversed and the array is moved in the opposite direction.

As described previously, the output signals from robot control 29 are fed via input 31 to microcomputer 22 for horizontal plane positioning of array 10 under the control of stepping motor 17. Essentially, array 10 is positioned so as to look in the quadrant that the robot arm 13 is moving toward. If the input information from the robot control 29 is the same as the current position, then the position of the array 10 is maintained. However, should horizontal reposition be required, the new position is calculated and the array 10 moved accordingly prior to the movement of the robot arm 13. This operation is continued and repeated during the operation of the device.

Thus, to position the array 10 in the desired direction, which is not necessarily the direction that the robot 14 is moving, the controller 22 reads simple binary signals from the robot's control console. Based on these signals, the controller 22 instructs the stepping motor 17 to position the array 10 in the desired horizontal quadrant of intended robot movement. No special interface is required from the robot 14 other than the ability to provide simple binary (on-off) outputs at any desired point in the robot's program.

The ultrasonic sensor array 10 continuously scans in an up/down fashion during the entire time the robot is active; however, the positioning of the array 10 in the horizontal plane comprises one of 16 predetermined positions. The stepping motor 17, thus, has the ability to precisely attain fixed and repeatable positions. Single step error is noncumulative and is generally specified at tolerances of less than about 5% of one step. Therefore, the motor 17 is intended to move the array 10 to a specific position and hold if necessary. The electronic drive circuitry is basically digital to simplify interface requirements to the microcomputer 22. Because of their positional accuracy, the stepping motor can be employed without feedback in an "open-loop" control system. However, to preclude the possibility of a missing step, preferably, optical encoders (not shown) are mounted on the shafts of both axes to provide both feedback and positional reference points.

The microcomputer 22 comprises, for example, an INTEL 8085 microprocessor having 2K of RAM. Port assignments are used for controlling the direction and pulsing of both motors 17 and 20, reading the limit and position sensors 28, resetting and monitoring the ultrasonic sensor array 10 and interfacing with the robot control 29. From a programming point of view, the system provides the robot 14 with a primitive sensing capability in the direction of movement of the robot 14 utilizing the system of the present invention.

The control of the safety system comprises two different activities. First, it is necessary to activate and monitor the ultrasonic sensor array 10 and second, it is necessary to control the positioning of the array 10 utilizing the stepping motors 17 and 20. In activating and monitoring the array 11, all five sensors 11 are treated as one. All are fired simultaneously and an echo is received by the system when any one of the sensors 11 receives an echo. Once an echo is received, the value of a counter included in the ultrasonic transducer electronics 15 is compared with a predetermined threshold counter value programmed into the microcomputer 22. When the counter is below the predetermined threshold, this indicates that an object is closer to the robot 14 than desired and therefore a flag is set putting the robot in a hold mode. The system continues with this cycle regardless of whether the robot is in a hold mode or not.

Another predetermined counter value is stored in the microcomputer 22 which indicates the maximum distance of concern. This prevents the problem of a "no echo" situation from putting the microcomputer 22 in an impasse situation, waiting for a nonexistant echo.

If there are areas in the robot's path where it needs to operate despite the detection of an object, the robot hold circuit is disabled. Either the program running on the ultrasonic ranging unit can inhibit the halting of the robot or a simple on-off signal derived from the robot program itself can disable the halt function. This allows the robot to maneuver and operate in areas when detection of an object would normally halt the robot.

In the case of aberrant motion, the system is programmed to detect motion of the robot arm 13 during a hold condition. This is accomplished by providing the system with the sensitivity to detect changes in ranging information which results when the robot arm unexpectedly moves during a hold conditon. Because the array 10 constantly scans in an up/down fashion the entire time the robot is activated, including a hold condition; any change in position of the array 10 due to the movement of the robot arm 13 will produce a change in the ranging information. By programming the system to sense such changes in ranging information during a hold condition, it is possible for the system to instruct the robot 14 to reestablish the hold condition when aberrant motion is detected or shut down the robot all together.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An ultrasonic ranging control system for a robot having a movable arm, said system comprising:
   (a) an ultrasonic transducer array for transmitting an acoustical pulse and for detecting a reflected echo, said transducer array being mounted proximate to the distal end of the movable arm so as to be arcuately pivotable in both a horizontal and vertical direction, said ultrasonic transducer array including a plurality of ultrasonic transducers arrayed in an angularly manner so as to emulate a single transducer with a wide transmit and receive pattern in substantially the horizontal plane, and each transducer having an individual beam width of approximately 10 degrees to each side, said individual transducers being arranged arcuately about a horizontal plane approximately 20 degrees apart, whereby with a quantity of five such transducers, a horizontal beam width of approximately 100 degrees is attained;
   (b) circuit means for measuring the elapsed time between initial transmission and echo detection by said transducer array and for providing an output signal indicative of said elapsed time and for conversion of said elapsed time to a signal representative of distance;
   (c) azimuth bi-directional stepping motor for positioning said transducer array horizontally about a vertical axis relative to the distal end of the movable arm independent of and prior to the movement of the arm;
   (d) an elevation bi-directional stepping motor for reciprocating said transducer array in an up and down vertical sweep about a horizontal axis relative to the distal end of the movable arm independent of and prior to movement of the arm;
   (e) a controller for activating and monitoring said ultrasonic transducer array to provide a command signal when said transducer array senses an unprogrammed obstruction within a predetermined threshold distance in the intended direction of travel of the robot arm and for effecting the control of said azimuth and elevation stepping motors whereby a continual up and down vertical sweep of said transducer array is performed as said transducer array is positioned in the horizontal plane so as to look in the intended direction of travel of the movable arm;
   (f) a hold circuit means for receiving said command signal from said controller and for providing a continuous hold signal to the robot arm as long as said transducer array senses the continuing presence of said unprogrammed obstruction within said predetermined threshold distance in the intended direction of travel of the robot arm; and
   (g) an end effector means positioned proximate the distal end of the movable arm for performing a predetermined robot work function, said end effector means being separate from and operating independent of said ultrasonic transducer array.

2. A systemm according to claim 1, further comprising means for controlling aberrant motion of said robot arm while said system is in the hold mode.

3. An ultrasonic ranging control safety system according to claim 1, wherein the extent of horizontal pivot of said transducer array about a vertical axis relative to the proximal end of the robot arm is about 135° in each direction from the horizontal centerline defined by the robot arm.

4. An ultrasonic ranging control safety system according to claim 3, wherein the extent of vertical sweep of said transducer array about a horizontal axis relative to the proximal end of the robot arm is about 75° in each direction from the position of the transducer array facing in a direction substantially parallel to the upper surface of the robot arm.

5. An ultrasonic ranging control safety system according to claim 4, wherein an audio alarm is sounded when an unprogrammed obstruction is sensed within a predetermined threshold distance of the robot arm.

6. An ultrasonic ranging control system for a robot having a movable arm, said system comprising:
   (a) an ultrasonic transducer array for transmitting an acoustical pulse and for detecting a reflected echo, said transducer array being mounted on said robot so as to be arcuately pivotable in both a horizontal and vertical direction independently of robot motion, said ultrasonic transducer array including a plurality of ultrasonic transducers arrayed in an angular manner so as to emulate a single transducer with a wide transmit and receive pattern in substantially the horizontal plane, and each transducer having an individual beam width of approximately 10 degrees to each side, said individual transducers being arranged arcuately about a horizontal plane approximately 20 degrees apart, whereby with a quantity of five such transducers, a horizontal beam width of approximately 100 degrees is attained;
   (b) means for arcuately moving said transducer array in a horizontal plane about a vertical axis prior to movement of the arm;
   (c) means for arcuately moving said transducer array in a vertical plane about a horizontal axis contemporaneously with said arcuate motion in a horizontal plane bout a vertical axis prior to movement of the arm;
   (d) means for measuring the elapsed time between initial transmission and echo detection by said transducer array and for providing an output signal indicative of said elapsed time for conversion of said elapsed time to a distance function;
   (e) controller means for activating and monitoring said ultrasonic transducer array to provide a command signal when said transducer array senses an unprogrammed obstruction within a predetermined threshold distance of said robot along an intended path of travel;
   (f) a hold circuit means for receiving said command signal from said controller means and for providing a continuous hold signal to the robot arm as long as said transducer array senses the continuing presence of said unprogrammed obstruction; and (g) an end effector means positioned proximate the distal end of the movable arm for performing a predetermined robot work function; said end effector means being separate from and operating independent of said ultrasonic transducer array.

* * * * *